Sept. 6, 1966   J. M. TILDESLEY   3,270,355
METHOD OF FORMING A PRESS NUT HAVING A SHROUDED SPIGOT
Filed Jan. 21, 1964
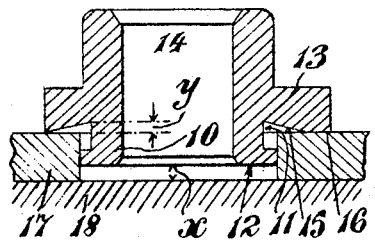
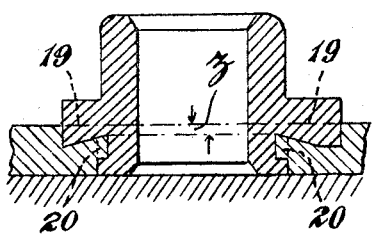
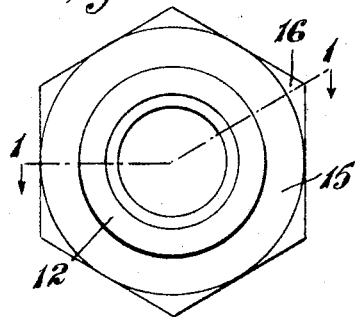
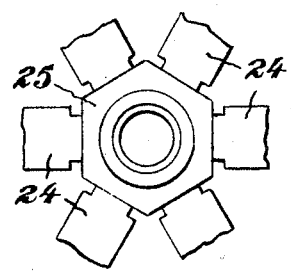
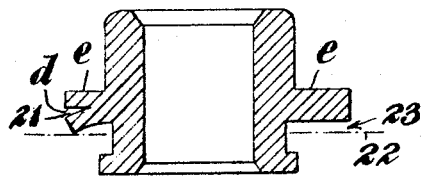
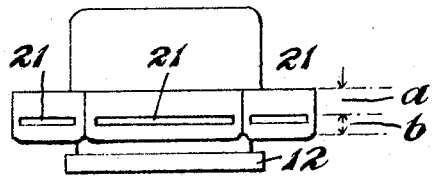
INVENTOR.
JOHN MATTHEW TILDESLEY
By
agent

United States Patent Office 3,270,355
Patented Sept. 6, 1966

3,270,355
METHOD OF FORMING A PRESS NUT HAVING A SHROUDED SPIGOT
John Matthew Tildesley, Willenhall, England, assignor to Precision Screw & Manufacturing Company Limited, Willenhall, England, a British company
Filed Jan. 21, 1964, Ser. No. 339,253
Claims priority, application Great Britain, Feb. 12, 1963, 5,590/63; Feb. 27, 1963, 7,793/63; Aug. 9, 1963, 31,449/63
4 Claims. (Cl. 10—86)

This invention relates to press-nuts and their manufacture and is a continuation-in-part of my application Serial No. 217,138 dated August 15, 1962, and now abandoned. This application is particularly concerned with nuts of the kind comprising a shank or spigot adapted to be located in a hole in sheet-metal and having a reduced diameter portion or neck and a (usually non-circular) flange which surrounds the spigot and rests on the sheet metal about the hole; the flange carries a tapped boss: when the nut is pressed towards the sheet the flange embeds in the sheet metal and causes it to flow into the neck. This prevents withdrawal of the nut and, due to the embedding of the non-circular flange, also prevents rotation of the nut. The nut may be embedded by a blow, for example in a press.

One of the problems in the actual manufacture of the nuts is to undercut the flange about the spigot, that is to make the surface located next to the sheet-metal of very shallow frusto-conical shape for example, because such configuration has a two-fold advantage. First it localises the presssure to the rim of the flange during the pressing which gives a good flow into the neck, and secondly it gives a possibly not obvious advantage in shrouding the neck portion of the spigot next to the flange: the point in this latter connection is that the length of the spigot, axially, is slightly less than the thickness of the sheet, and since the nut is pressed into the sheet until the end face of the spigot is flush with the face of the sheet on the anvil or press bed, the flow of sheet metal has to be initiated and completed in a travel equal to the degree of shrouding plus the difference between the length of the spigot and the thickness of the sheet. Hence the greater the degree of shrouding the greater the length of travel possible resulting in a greater amount of metal displaced and the better chance of efficient locking of the nut to the sheet.

The shrouding has hitherto been effected by machining metal from the underside of the flange but this is not simple and calls for very accurate machining particularly with small sizes of nuts, this is not always economically feasible, and moreover, deep shrouding is impossible.

The objects of the present invention are to provide an improved method of making press nuts, and to provide for deep shrouding thereof.

In accordance with the present invention a nut of the kind adapted for fixing in sheet metal by a press operation comprises an internally threaded body, a hexagonal flange on said body and a spigot extending from said flange, the spigot having a reduced thickness neck adjacent the flange, and a part only of the surface of the flange adjacent the spigot being undercut.

Also in accordance with the present invention, a method of making a press-nut of the kind comprising a spigot and a flange, comprises deforming the flange by axial displacement of the entire circumference thereof or by closely spaced circumferential parts thereof until the axial portion of the spigot adjacent the flange is shrouded.

Preferably the deformation is achieved by indenting the flange locally, for example by chisel-like press-tools which contact the flange about its periphery and split the flange into the parts with deformation of the thinner part about the spigot. When the flange is hexagonal each tool will contact one of the flats between the hexagon apices so that a small portion of the periphery about each apex will remain unslit; this may give the rim of the flange which is to contact the sheet metal a slightly wavy appearance but this does not affect performance and may even improve it.

Alternatively the flange may be deformed by plunging through a taper die with the aid of a punch-like tool, so as to shroud the flange about the spigot: the punch in this case preferably has a bore receiving the spigot to prevent the punch actually causing displacement itself and cutting into the flange as in most cases it is preferred to use the punch as a form on which the flange is spread.

The invention is more particularly described with reference to the accompanying drawings, wherein:

FIGURE 1 is a sectional elevation on line 1—1 of FIGURE 3 showing a press-nut in place ready to be secured to a piece of sheet metal;

FIGURE 2 is a view similar to FIGURE 1 showing the nut secured;

FIGURE 3 is an underside plan view of the nut of FIGURES 1 and 2;

FIGURE 4 is a sectional elevation of a second nut;

FIGURE 5 is an elevation of the second nut;

FIGURE 6 is a diagrammatic plan, on a small scale, illustrating the method of manufacture of the nut shown in FIGURES 4 and 5;

FIGURE 7 is a diagrammatic sectional elevation showing a second method of making nuts; and FIGURE 8 is a sectional elevation of a nut made in accordance with FIGURE 7.

Referring first to FIGURES 1-3 which illustrate the kind of nut concerned and the method of securing, it will be seen that the nut comprises a spigot 10 with a neck or groove 11 disposed between the end 12 of the spigot and the hexagonal flange 13; the nut is bored and threaded axially as at 14. The flange 13 is undercut so that the face 15 is frusto-conical and is acutely related to the axis of the nut. The frusto-conicity creates a rim 16 which surrounds the flange and varies in width from a minimum line thickness at the centres of the flats to a definite width at the hexagon apices.

As shown in FIGURE 1 the nut is disposed in a hole in the sheet metal 17 on an anvil or the like 18 and rim 16 contacts the sheet metal. The permissible travel of the nut in securing same is equal to the distance $x$ which is the axial dimension between face 12 and anvil 18. The undercut in the flange is equal to distance $y$, i.e. the dimension between the root of the undercut and the sheet-metal, and this plus the distance $z$, FIGURE 2 (which is the amount of travel of the thinnest part of the flange into the sheet-metal) is equal to distance $x$.

As the nut is pressed into the sheet-metal to embed the rim as shown in FIGURE 2, metal is caused to flow into the neck as shown in FIGURE 2. Chain-dot lines 19, 20, FIGURE 2 illustrate the original line of the sheet-metal so that the metal up to line 19 has been displaced over line 20.

In a typical example of a small nut, a 2 B A size nut having a threaded bore 4.7 mm. in diameter and intended for application to sheet metal of 18 S.W.G., 0.048 inch (approximately 1.22 mm.) thickness or to thicker material, has a spigot 0.040 inch long. If the flange of this nut is planar, and contacts the sheet over its whole surface, the flow of metal has to be achieved during .008 inch of travel, i.e. distance $z$ FIGURE 2. By making the undercut the effect is that the total distance travelled is equal to $y$ FIGURE 1, plus $z$ FIGURE 2, that is, to the dimension $x$. Hence if the nut spigot is shrouded by 0.010 inch ($y$) and is shorter than the thickness of the sheet by 0.008 inch ($z$) then the travel is .018 inch ($x$). Since even under a hammer blow-like impact the time of impact is important, the time of travel will be increased in the proportion 18:8 and therefore a more efficient fixing will be achieved.

FIGURES 4 and 5 illustrate a form of nut according to the invention in which each flat of the hexagonal flange is indented locally by chisels approximately .018 thick at the point of maximum penetration into the nut between the apices as at 21, the indentations being at a position nearer the spigot free end 12; the position of the line along which the chisels first engage, and hence of one wall of each indent is preferably about the distance $a$ from the rim 16 and $b$ from the opposite face of the flange as shown in FIGURE 5. Distance $a$ is greater than $b$, and in the size referred to these dimensions may be in the ratio $a:b=26:22$. The thickness of the flange where deformed by the undercut, in the example given is slightly reduced, and it is found that flange .048 inch thick, after indenting, forms two portions, .026 and .014 inch (the latter being reduced to this value by thinning, stretching, etc.) approximately respectively. The chain dot line 22 in FIGURE 4 illustrates the line of the surface of the sheet metal when ready for securing and shows that the rim 16 is spaced from the metal as at 23 at the apices, the dimension of space 23, in the example quoted being about .010 inch.

FIGURE 6 illustrates six chisels 24 located about the nut 25 when performing the indenting operation. This may be done by any convenient tooling, for example the chisels 24 may be driven in by an eccentric cam ring rotated about the nut relative to a guide plate locating the chisels, and this could be done after the spigot has been fashioned in a capstan lathe prior to parting off from bar stock.

The chisels preferably have parallel edged tips which perform the actual indenting, and the converging faces of the tips may be inclined at about 60° to one another, the faces being arranged so that one face $d$ (FIGURE 4) of the indentation is parallel to the top face $e$ of the flange and so that said top face remains undisturbed by the indentation.

FIGURE 7 illustrates an alternative method in which already shaped nuts 26 are pressed through a taper die orifice 27 by a punch 28 which is a slide fit in the smallest portion of the orifice. The nuts may be ejected by the punch or by the succeeding nut. FIGURE 8 is a sectional view showing the nut after this operation. It will be noted that the punch has a bore 29 which receives the spigots and transmits pressure thereto.

I claim:

1. A method of making a press-nut comprising a hexagonal flange having six flat edge portions and six apices and a spigot, which comprises indenting said flat edge portions of the flange by means of a chisel-like tool at positions located nearer the face of the flange from which said spigot projects than the opposite face and over substantially the entire circumferential length of each edge portion short of said apices, said indenting splitting the flange into two laminae of which the thinner is deformed to shroud the spigot and the thicker remains substantially undeformed.

2. A method of making a press-nut having a flange, the flange having an axis and a spigot axially projecting from a face of said flange, which method comprises axially displacing a plurality of circumferential parts of said flange until said parts jointly shroud an axial portion of said spigot adjacent said face of the flange, said parts being circumferentially spaced from each other, and the spacing of each pair of circumferentially juxtaposed parts being substantially smaller than the circumferential length of each part of said pair.

3. A method as set forth in claim 2, wherein said face is flat and planar prior to said displacing, and said parts of said flange are axially displaced until said face of the flange is concave and substantially frustoconical.

4. A method as set forth in claim 2, wherein said flange is polygonal and has a plurality of flat peripheral edge portions respectively including said circumferential parts and a corresponding number of apices interposed between respective pairs of flat edge portions, said parts being displaced by indenting each flat edge portion by means of a chisel-like tool at positions located nearer the face of the flange from which said spigot projects than the opposite face, and over substantially the entire circumferential length of each edge portion short of the apices, said indenting substantially splitting the flange into two laminae of which the thinner is deformed to shroud said axial portion of the spigot, and the thicker remains substantially undeformed.

References Cited by the Examiner

UNITED STATES PATENTS

| | | | |
|---|---|---|---|
| 2,125,878 | 8/1938 | Beasley | 151—38 |
| 2,685,320 | 8/1954 | Rosan | 151—41.73 |
| 2,740,034 | 3/1956 | Carlyle | 10—86 |
| 2,761,483 | 9/1956 | Richardson | 10—86 |
| 3,045,735 | 7/1962 | Kern | 10—86 |
| 3,125,146 | 3/1964 | Rosan | 151—41.73 |

ANDREW R. JUHASZ, *Primary Examiner.*

EDWARD C. ALLEN, *Examiner.*